United States Patent
Taddei et al.

(10) Patent No.: US 9,333,446 B2
(45) Date of Patent: May 10, 2016

(54) APPARATUS AND METHOD TO REMOVE UNDISSOLVED SOLIDS FROM POST PROCESS DRY FILM STRIP SOLVENTS

(71) Applicant: VEECO PRECISION SURFACE PROCESSING LLC, Horsham, PA (US)

(72) Inventors: John Taddei, Breinigsville, PA (US); Laura Mauer, South Kent, CT (US); John Clark, Philadelphia, PA (US); Lev Rapoport, Yardley, PA (US)

(73) Assignee: VEECO PRECISION SURFACE PROCESSING LLC, Horsham, PA (US)

( * ) Notice: Subject to any disclaimer, the term of this patent is extended or adjusted under 35 U.S.C. 154(b) by 629 days.

(21) Appl. No.: 13/862,944

(22) Filed: Apr. 15, 2013

(65) Prior Publication Data

US 2014/0305886 A1    Oct. 16, 2014

(51) Int. Cl.

| | |
|---|---|
| *B01D 29/56* | (2006.01) |
| *B01D 29/62* | (2006.01) |
| *B01D 29/64* | (2006.01) |
| *B01D 29/90* | (2006.01) |
| B01D 29/58 | (2006.01) |
| B01D 29/05 | (2006.01) |

(52) U.S. Cl.
CPC ............. *B01D 29/56* (2013.01); *B01D 29/62* (2013.01); *B01D 29/6438* (2013.01); *B01D 29/908* (2013.01); *B01D 29/05* (2013.01); *B01D 29/58* (2013.01)

(58) Field of Classification Search
None
See application file for complete search history.

(56) References Cited

U.S. PATENT DOCUMENTS

| | | | | |
|---|---|---|---|---|
| 388,863 | A * | 9/1888 | Gruber | B01D 29/01 210/339 |
| 813,516 | A * | 2/1906 | Pfautz | B01D 29/01 210/339 |

* cited by examiner

*Primary Examiner* — Terry Cecil
(74) *Attorney, Agent, or Firm* — Leason Ellis LLP (57) ABSTRACT

An apparatus for filtering dry film solvent includes a hollow vessel having a side wall, an open top end and a second end that includes a main outlet that allows fluid to flow out of a hollow interior of the vessel. A removable cover closes off the open top end of the vessel. The apparatus also includes at least one fluid inlet port formed along the side wall of the vessel and defining an entrance into the hollow interior of the vessel and at least one fluid outlet port formed along the side wall of the vessel and defining an exit from the hollow interior of the vessel. A removable filter member is disposed within the hollow interior and is defined by a frame and filter media that extends across the frame such fluid flowing into the hollow interior through the main inlet must flow through the filter media to reach the main outlet. The filter media is disposed at an angle other than 90 degrees relative to the frame of the filter member.

21 Claims, 4 Drawing Sheets

APPARATUS AND METHOD TO REMOVE UNDISSOLVED SOLIDS FROM POST PROCESS DRY FILM STRIP SOLVENTS

TECHNICAL FIELD

This invention generally relates to an apparatus and method for removal of solid material from a liquid. More specifically, this invention relates to an apparatus and method for removing un-dissolved dry film materials from a recycle solvent stream utilizing a space efficient design and in a fashion that greatly reduces equipment downtime to maintenance and in a health friendly fashion.

BACKGROUND

Photo resists are a number of light sensitive materials commonly used in industrial processes. In the semiconductor industry photo resist is applied to a substrate (circuit board or wafer) and then exposed with light through a mask. The photo resist is then developed via exposure to a chemistry that will remove a portion of the resist. The result is a substrate partially protected by photo resist and partially exposed. The substrate then sees additional processing (etching, plating . . . ). At some point the photo resist no longer has a purpose and needs to be removed. Solvents are typically employed to remove the resist from the substrate. The solvent is typically collected for re-use. Post strip the substrate is rinsed and then dried. The substrate is ready for the next step in the manufacturing process.

Dry Film is one such material with light sensitive properties. It is commonly used in the microelectronic industries for circuit board or semiconductor manufacturing. It is superior to liquid resists at providing thick, uniform films that permit increased pattern density. There are a number of dry films products from a number of manufacturers; likewise there is a variety of chemistries that are used to strip the dry film from the substrate.

Dry films are comprised of a number of components. A partial list includes: monomers, binding agents, photo initiators, stabilizers, plasticizers, anti halation agents and dyes. These components vary widely in their ability to dissolve in chemistry and the chemistries used to strip dry films vary in their ability to dissolve components of dry film.

Solvent that is used to strip the dry film will partially dissolve the dry film. Those components that are not dissolved will range from chunks of un-dissolved dry film to a gelatinous sludge. These materials will clog filters, strainers and piping for tools designed to handle standard soluble photo resist after a small number of substrates are processed. The strip tool must be shut down and manually cleaned. The un-dissolved material must be removed in order to resume operations. Dry film debris and solvents used to remove dry film have serious health concerns. Manually cleaning up dry film strip residue is extremely un-desirable and outright prohibited at some locations. The cost for replacing filters or filter elements is high.

Due to the large quantities, dimensions and viscosity of the residual material the space provided for plumbing is disproportionately large. Larger diameter piping and an increase in number and size of strainers and filters results in larger dimensioned tools than for standard photo resist. Typical semiconductor manufacturing is conducted with low contaminate clean rooms that are expensive to build and operate. Therefore oversized equipment directly translates to increased operational cost.

SUMMARY

In one embodiment, an apparatus for filtering dry film solvent in accordance with the present invention includes a hollow vessel having a side wall, an open top end and a second end that includes a main outlet that allows fluid to flow out of a hollow interior of the vessel. A removable cover closes off the open top end of the vessel. The cover includes a main inlet to allow fluid to flow into the hollow interior of the vessel. The apparatus also includes at least one fluid inlet port formed along the side wall of the vessel and defining an entrance into the hollow interior of the vessel and at least one fluid outlet port formed along the side wall of the vessel and defining an exit from the hollow interior of the vessel.

The apparatus also includes a removable filter member that is disposed within the hollow interior. The removable filter member is defined by a frame and filter media that extends across the frame and is disposed transversely across the hollow interior of the vessel such fluid flowing into the hollow interior through the main inlet must flow through the filter media to reach the main outlet. The filter media is disposed at an angle other than 90 degrees relative to the frame of the filter member. The removable filter member is disposed within the hollow interior such that at least one fluid inlet port and the fluid outlet port are disposed above a top surface of the filter media and in registration with one or more openings formed in the frame of the filter member, thereby permitting a cleaning solution to flow through the at least one fluid inlet port into the filter member and across the filter media before exiting the filter member and flowing through at least one outlet port.

DETAILED DESCRIPTION OF CERTAIN EMBODIMENTS

It is to be understood that the figures and descriptions of the present invention have been simplified to illustrate elements that are relevant for a clear understanding of the present invention, while eliminating, for the purposes of clarity, many other elements which may be found in the present invention. Those of ordinary skill in the pertinent art will recognize that other elements are desirable and/or required in order to implement the present invention. However, because such elements are well known in the art, and because such elements do not facilitate a better understanding of the present invention, a discussion of such elements is not provided herein.

FIGS. 1-6 illustrate an apparatus 100 for removing undissolved solids from post process dry film strip solvents in accordance with one embodiment of the present invention. The apparatus 100 is configured to be easily implemented in a post process filtration scheme as disclosed herein. The apparatus 100 is in the form of a filtration device that is for use in the post process filtration scheme. For illustration purposes, the figures show the apparatus 100 as being part of a post filtration scheme, generally indicated at 10, that includes a first conduit 20 that carries a post process liquid from a processing station 30 to the apparatus 100. As will be described hereinafter, the first conduit 20 fluidly connects the processing station 30 to the apparatus 100. A second conduit 40 is in fluid communication with the filtration apparatus 100 for receiving the filtrate liquid from the apparatus 100 and routing it to another location, identified at 50.

The apparatus 100 includes a vessel (housing) 200 that has is defined by a body which can have any number of different shapes including the cylindrical shape shown in the figures. The vessel 200 has a first end 202 and an opposing second end 204, with the first end 202 being open, while the second end 204 is for the most part a closed end as described below. When the vessel 200 has a cylindrical shape (as shown), it is defined by a side wall 210 and a bottom wall or floor structure 220 that is joined to the side wall 210 at a bottom edge thereof. At the first end 202, a flange or lip 215 is formed. The flange 215 is an outwardly directed structure that has a flat (planar) top surface (face) 217.

Figure 4:
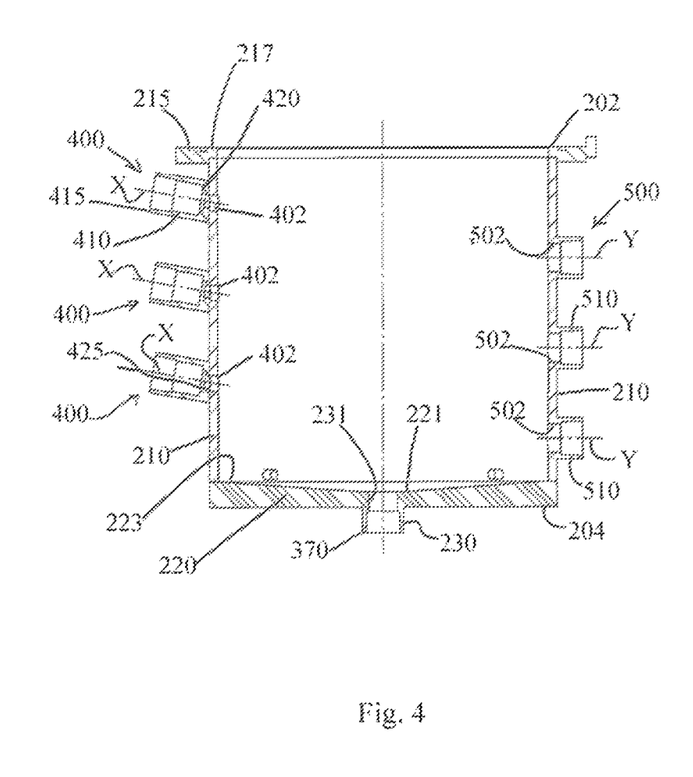
FIG. 4 is a cross-sectional view taken along the line 4-4 of FIG. 3.

As shown in FIG. 4, the floor 220 does not have to be planar in nature but instead it can be formed at a pitch. More specifically, the floor 220 can be formed such that its center section 221 represents the bottommost portion of the floor 220 and thus, the floor 220 is formed at an angle from the outer peripheral section 223 which is attached to the side wall 210 towards the center section 221. This permits fluid that collects on the outer peripheral section of the floor 220 to flow inwardly toward the center section 221 since the center section 221 is recessed relative to the outer peripheral section 223.

As shown, the floor 220 includes an outlet or exit port 230 which is in the form of a through opening 231 formed in the floor 220. In the illustrated embodiment, the outlet 230 is formed centrally within the floor 220 and thus, the outlet 230 is formed in the recessed section of the floor 220. The outlet 230 is thus in a location in which fluid can flow by gravity from the outer peripheral section to the outlet 230 due to the angled nature of the floor 220. The outlet 230 can be a circular shaped opening or can have any other shape. As shown in the cross-sectional view of FIG. 4, the outlet 230 can include an outwardly directed annular shaped wall 370 (e.g., cylindrical shape) that is formed about the perimeter of the opening formed in the floor 220. The wall 370 can act as a connector in that it provides a surface to which the outlet conduit (e.g., a tube) 40 can be attached. For example, the outlet conduit can be frictionally attached to the wall 370 to transport filtered fluid to the vessel 200 as described below.

The vessel 200 is also constructed to have a number of other inlet and outlets in accordance with the present to both selectively allow fluid to flow into the hollow interior of the vessel 200 and to allow fluid to flow out of the vessel 200. More specifically, the vessel 200 includes at least one and preferably, a plurality of fluid inlets 400 that are disposed along the side wall 210 of the vessel 200. Each fluid inlet 400 is defined by an opening 402 (bore/through hole) that is formed through the side wall 210 of the vessel 200 to provide an entrance into the hollow interior of the vessel 200. Each fluid inlet 400 can be in the form of a nozzle structure in that it includes a connector housing 410 that is fluid attached to and can be integrally formed with the side wall 210 such that a hollow interior of the housing 410 is in fluid communication with the opening 402 formed in the side wall 210.

Figure 1:
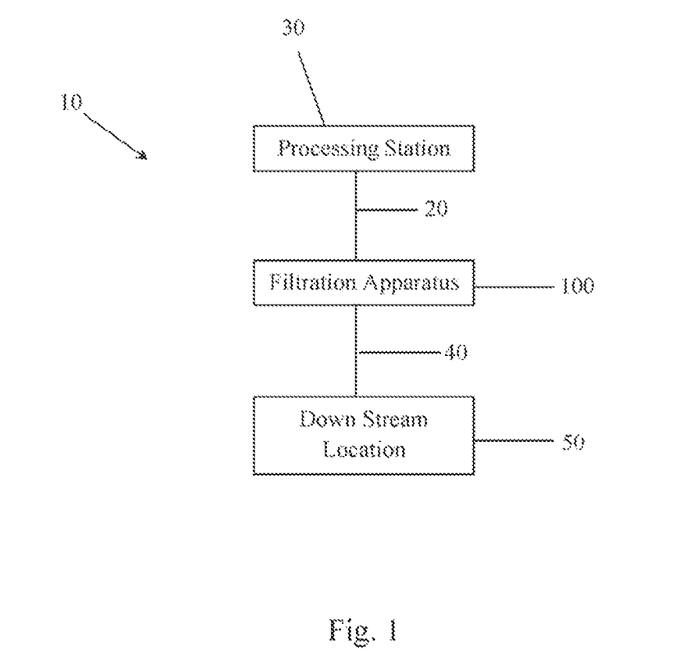
FIG. 1 is a general schematic showing a filter apparatus of the present invention in a processing scheme in which a liquid to be cleaned is delivered to the apparatus for removal of solid material from the liquid.
Figure 2:
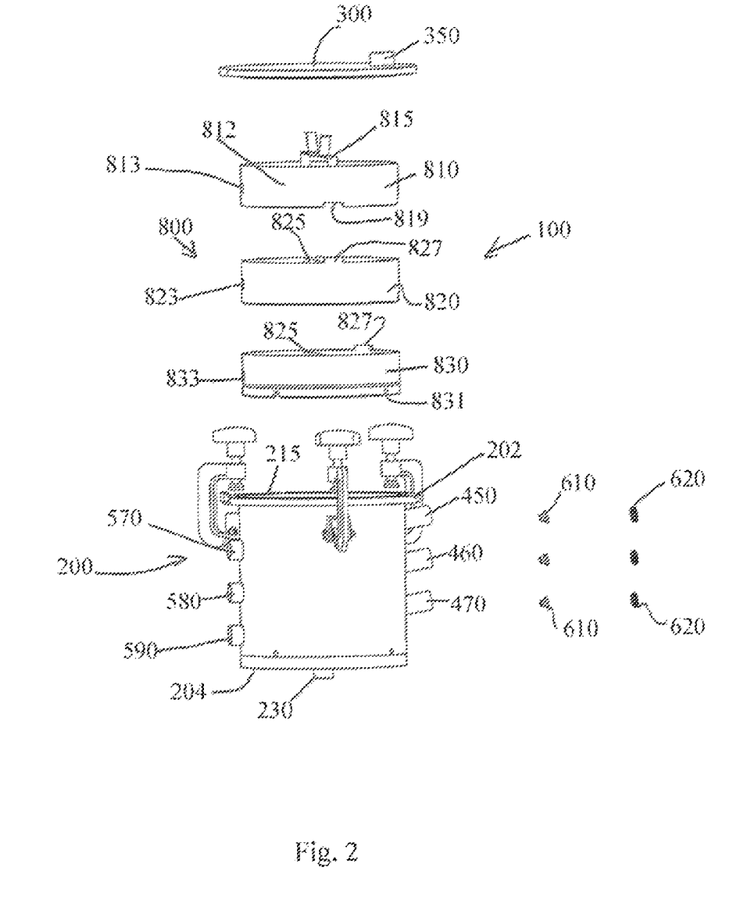
FIG. 2 is an exploded side perspective view showing the various components of the filter apparatus.
Figure 3:
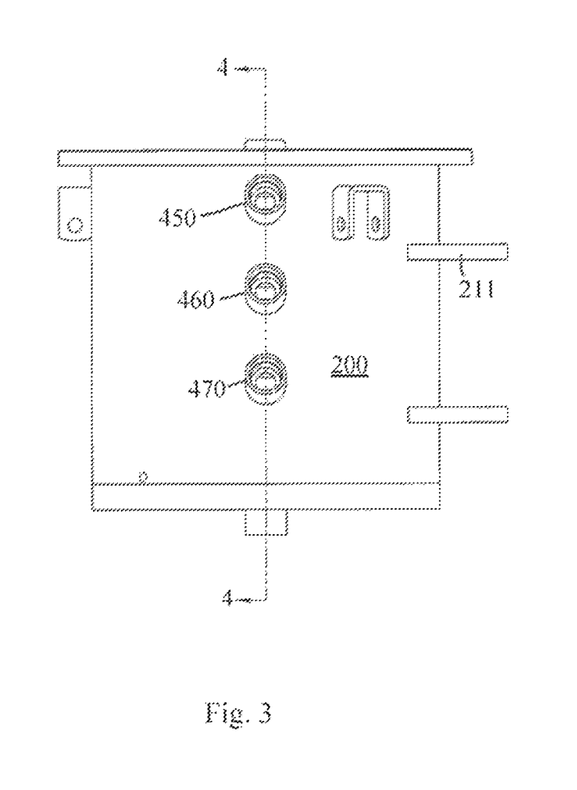
FIG. 3 is a side elevation view showing angled inlets of the filter apparatus that are intended for delivering cleaning solution to an interior of a vessel (housing) of the apparatus.
Figure 5:
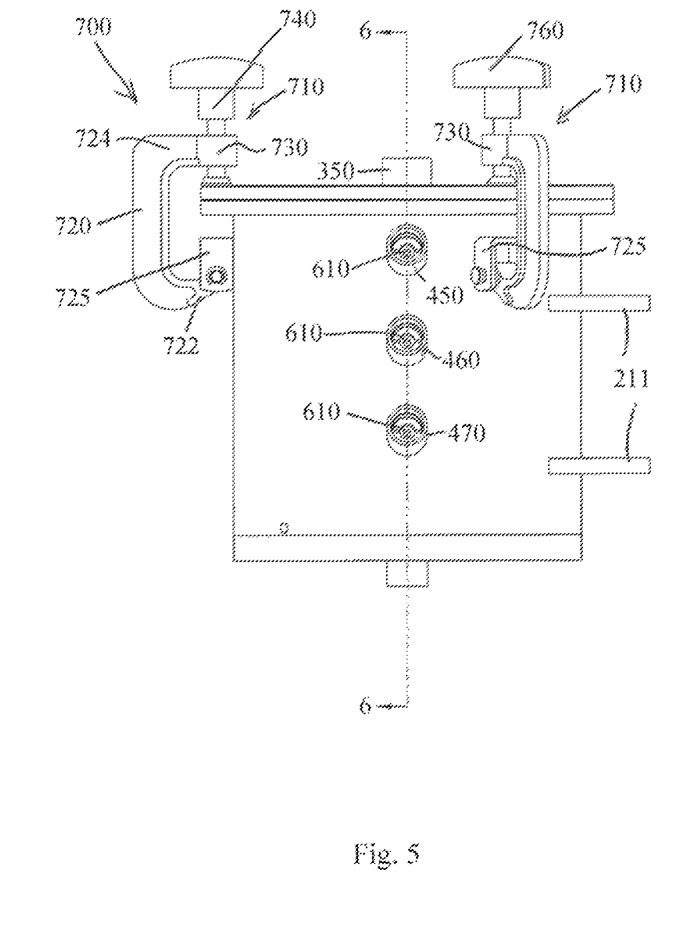
FIG. 5 is a side elevation view of the vessel with a cover securely attached (clamped) thereto.
Figure 6:
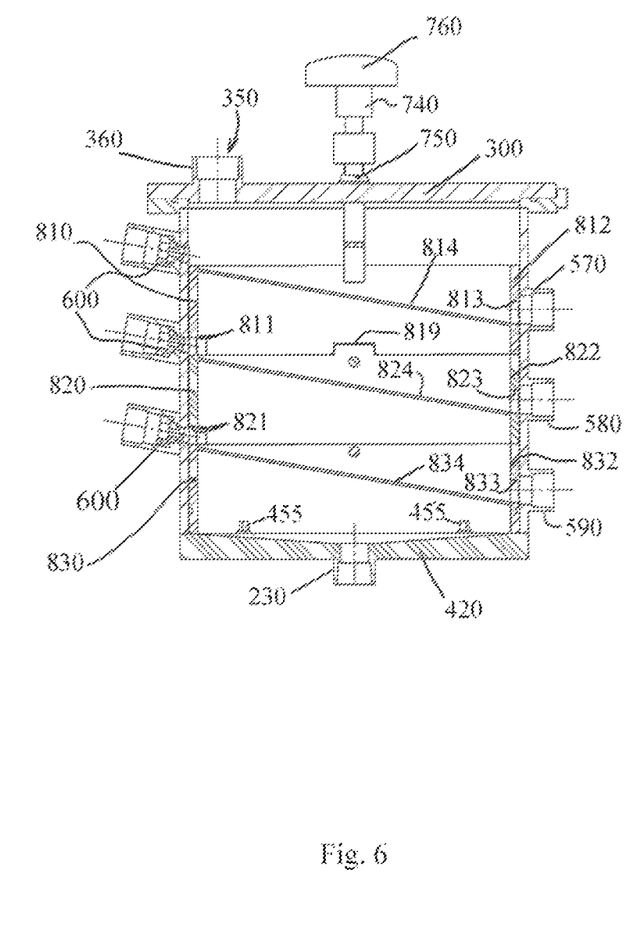
FIG. 6 is a cross-sectional view taken along the line 6-6 of FIG. 5 showing a plurality of filter members that are disposed within the vessel in a stacked configuration to provide a filter scheme that operates in series.

The connector housing 410 can be in the form of a tubular structure that extends outwardly from the side wall 210 of the vessel 200. The tubular structure 410 can be in the form of an annular shaped structure that has a non-uniform inner diameter. As shown in FIG. 4, the inner surface of the tubular structure 410 can have a stepped structure with the greatest inner diameter being at a free distal end 415 of the connector housing 410. The stepped inner surface of the tubular structure 410 can include a floor 420 that can have a recessed section 425 that can function at least partially as a valve seat for receiving a valve assembly 600 (such as a one way valve). FIGS. 2, 5 and 6 best show the valve assembly 600. One exemplary valve assembly 600 includes a valve seat member 610 and mates with a valve member 620. The valve member 620 is configured to permit fluid to flow in one direction, namely, in a direction into the hollow interior of the vessel 200 by passing through the opening 402 which is located proximate (adjacent) the valve assembly 600.

As shown, the fluid inlets 400 can be formed linearly along the side wall 210 with the illustrated embodiment including a first fluid inlet 450, a second fluid inlet 460, and a third fluid inlet 470 that are formed linearly along the side wall. The first fluid inlet 450 being formed proximate the top end of the vessel and the third fluid inlet 470 being formed proximate the bottom end of the vessel and the second fluid inlet 460 being formed between the first and third fluid inlets 450, 470.

While the opening 402 can be formed perpendicular to the side wall 210, the connector housing 410 can be formed at an angle (other than 90 degrees) relative to the side wall 210. In other words and as shown in FIG. 4, the central axis X of the connector housing 410 intersects the side wall 210 at an angle other than 90 degrees. The axes X of the connector housings 410 can be parallel to one another. The axis X is thus not concentric with a central axis of the opening 402.

The connector housing 410 provides a surface to which a fluid conduit (e.g., tubing) can be attached (similar to the exit port 230). The fluid conduit provides the means for delivering fluid to each respective fluid inlet 400.

The fluid inlets 400 can be evenly spaced from one another or the distance between adjacent fluid inlets 400 can vary.

The vessel 200 also includes at least one and preferably a plurality of fluid outlets 500 formed along the side wall 210. The number of fluid outlets 500 should match the number of fluid inlets 400. In the illustrated embodiment, there are three fluid outlets, namely, a first fluid outlet 570, a second fluid outlet 580, and a third fluid outlet 590.

The fluid outlets 500 are defined by openings 502 that are formed in the side wall 210. The fluid outlet 500 includes a tubular connector housing 510 that is attached to and is preferably integrally formed with the side wall 210 of the vessel 200. The connector housing 510 defined a hollow interior and extends radially outward from the side wall 210. The connector housing 510 can have a cylindrical shape or can have another shape. The distance that the connector housing 510 extends outwardly from the side wall 210 can be different than the distance that the connector housing 410 extends outwardly from the side wall 210.

The size (as measured in terms of area) of the opening 502 is preferably greater than the opening 402. In other words, the diameter of the opening 502 is greater than the diameter of the opening 402.

As shown, a central axis Y of each fluid outlet 500 is perpendicular to the side wall 210 and does not intersect one of the connector housings 410. The fluid outlets 500 are thus interspersed between the fluid inlets 500 as shown. For example, when there are three fluid inlets 400 and three fluid outlets 500, the topmost first fluid outlet 570 is located between the first and second fluid inlets 450, 460; the second fluid outlet 580 is located between the second and third fluid inlets 460, 470; and the third fluid outlet 590 is located between the third fluid inlet 470 and the bottom end of the vessel 200.

The floor 420 can also include one or more locating members 455 that are formed thereon and providing a locating and locking features as described below. There can be a plurality of locating members 455 that are located in spaced relationship along the floor 420 and preferably, the locating members 455 are located proximate the side wall (i.e., in the outer peripheral section). The locating members 455 can be in the form of tabs or the like formed along the floor 420.

The apparatus 100 also includes a cover 300 that is configured to mate with the first end 202 of the vessel 200 for closure thereof. More specifically, the cover 300 is configured to seat flush on and against the top surface 217 of the flange 215 and is sized to close off the open top end of the vessel 200.

Any number of different techniques can be used to secure the cover 300 to the first end 202 of the vessel 200. For example, a mechanical mechanism, such as a latch or clamp or lock, can be used to releasably lock the cover 300 to the first end 202 of the vessel 200. In the illustrated embodiment, the cover 300 is attached using a clamp mechanism 700. The clamp mechanism 700 is formed of a plurality of separate clamp members 710 that can be integrally attached to the vessel 200 as shown in the figures. Each clamp member 710 includes a vertical support 720 that is attached at its bottom end 722 to a bracket 725 that is attached to (or integrally formed with) outer surface of the side wall 210 of the vessel 200. More particularly, the vertical support 720 can be in the form of a C-shaped support that is pivotally attached at the bottom end 722 to the side wall 210. This pivoting action allows the vertical support 720 to be pivoted away from the top of the cover 300 so as to allow for easy removal of the cover 300.

At an opposite top end 724 of the vertical support 720, the vertical support 720 includes an inwardly directed arm portion 730 that terminates at a location that is above the first end 202 when the vertical support 720 is in an upright position and more specifically, is generally directly above the flange member 215 that is formed at the first end 202 when the vertical support is in the upright position. A driveable member 740 with an enlarged head 750 is coupled to the arm 730 and is driveable along a vertical axis both towards and away from the flange member 215. The illustrated driveable member 740 includes a knob or handle 760 that is rotated by the user to cause the member 740 to be driven either towards or away from the flange member 215.

The driveable member 740 can thus be a member that has threads on an outer surface thereof and is threadingly received within a threaded bore that passes through the arm portion 730. Rotating the driveable member 740 is one direction causes the advancement of the member 740 within the threaded bore in a direction towards the cover 300, while rotation in the opposite direction causes the driveable member 740 to be driven in a direction away from the cover 300. The head 750 can have a shape and size complementary to the dimensions of the flange member 215 and in particular, the head 750 can have a round shape with a diameter that is equal to or less than the width of the flange member 215. The head 750 can also have a pad or the like since it is placed in compression with the cover 300.

The clamp device 710 can thus resemble a vise member in terms of its operation in that the vertical support 720 is pivoted into the upright position and then the driveable member 740 is driven towards the cover 300 until the head 750 is driven thereagainst to provide a secure attachment between the cover 300 and the vessel.

The cover 300 includes an inlet port 350 which is in the form of an opening formed through the cover 300. In particular, the inlet port 350 can include an outwardly directed annular shaped wall 360 (e.g., cylindrical shape) that is formed about the perimeter of the opening formed in the cover 300. The wall 360 can act as a connector in that it provides a surface to which an inlet conduit (e.g., a tube) can be attached. For example, the inlet conduit can be frictionally attached to the wall 360 to deliver a fluid to the vessel 200 as described below. As shown in the figures, the inlet port 350 does not have to be centrally located within the cover 300 but instead can be eccentrically formed.

The apparatus 100 also includes a filtering mechanism 800 that is in the form of filter media that is disposed within the hollow interior of the vessel 200 and is configured for filtering fluid that enters the fluid inlet 350. The filtering mechanism 800 includes at least one and preferably a plurality of discrete filter members. For example, the filtering mechanism 800 includes a first filter member 810, a second filter member 820, and a third filter member 830. As shown, the filter members 810, 820, 830 can assume a stacked orientation, with the third filter member 810 being the top member, the second filter member 820 being the middle member, and the third filter member 830 being the bottom member. In accordance with the present invention, the filter members 810, 820, 830 have different filtering characteristics relative to one another. For example, the size of the openings in the filter members 810, 820, 830 can be different. Thus, in accordance with one embodiment, the first filter member 810 has a first mesh size; the second filter member 820 has a second mesh size, and the third filter member 830 has a third mesh size. The filter members 810, 820, 830 are thus designed to filter out different sized materials, with the mesh size progressively becoming smaller in the direction towards the floor 420. In other words, the first mesh size<the second mesh size<the third mesh size.

The filter mechanism 800 is intended to be placed within the hollow interior of the vessel 200 and is thus disposed between the inlet 350 and the outlet 230 such that fluid flowing into the vessel 200 through the inlet 350 passes through the filter mechanism 800 before exiting through the outlet 230. When the mechanism 800 includes plural filter members, the fluid passes through each of the plural filter members before existing through the outlet 230.

The filter members 810, 820, 830 can each be in the form of a filter basket structure that can be individually or collectively removed from the hollow interior of the vessel 200. The filter member 810 is defined by a side wall 812 and filter media 814 that is attached to and extends transversely across the opening defined between the side wall 812. The side wall 812 is formed of a fluid impervious material (e.g., metal or plastic), while the filter media 814 is defined by a mesh of a certain size. In accordance with the present invention, the filter media 814 is disposed at an angle (other than 90 degrees) relative to the side wall 812. FIG. 6 shows the angled nature of the filter media 814. The filter media 814 is thus formed at a downward slope and as discussed below, this orientation of the filter media 814 permits fluid to flow across the filter media.

In one embodiment, the filter media 814 (as well as the other filter media described below) is disposed at an angle of greater than about 45 degrees to less then 90 degrees (e.g., 80 degrees) relative to vertical.

The side wall 812 includes an opening 813 formed therein which functions as an outlet to permit fluid within the filter member 810 to selectively flow out of the filter member 810. The filter media 814 is formed in relation to the opening 813 and more particularly, the filter media 814 intersects the side wall 812 at a location immediately below the opening 813.

As best shown in FIG. 6, the angle at which the filter media 814 is purposely selected and the opening 813 is purposely formed at a location along the side wall 812 such that when the filter members 810, 820, 830 are stacked and placed in the hollow interior of the vessel 200, the opening 813 is disposed adjacent the opening 502 of the outlet 570.

The filter member 810 also can include an opening (slot or notch) 811 formed along the bottom edge of the side wall 812. The side wall 812 can include a locating and locking member 819 that is formed along a bottom edge thereof. Each locking member 819 can be in the form a notch or the like. The filter member 810 can also include a handle 815 that allows a user to pick up and remove (and insert) the filter member 810.

The filter member 820 is defined by a side wall 822 and filter media 824 that is attached to and extends transversely across the opening defined between the side wall 822. The side wall 822 is formed of a fluid impervious material (e.g., metal or plastic), while the filter media 824 is defined by a mesh of a certain size. In accordance with the present invention, the filter media 824 is disposed at an angle (other than 90 degrees) relative to the side wall 822. FIG. 6 shows the angled nature of the filter media 824. The filter media 824 is thus formed at a downward slope and as discussed below, this orientation of the filter media 824 permits fluid to flow across the filter media.

The side wall 822 includes an opening 823 formed therein which functions as an outlet to permit fluid within the filter member 820 to selectively flow out of the filter member 810. The filter media 824 is formed in relation to the opening 823 and more particularly, the filter media 824 intersects the side wall 822 at a location immediately below the opening 823.

As best shown in FIG. 6, the angle at which the filter media 824 is purposely selected and the opening 823 is purposely formed at a location along the side wall 822 such that when the filter members 810, 820, 830 are stacked and placed in the hollow interior of the vessel 200, the opening 823 is disposed adjacent the opening 502 of the outlet 580.

The filter member 820 also can include an opening (slot or notch) 821 formed along the bottom edge of the side wall 822. The side wall 822 can include a locating and locking member 819 that is formed along a bottom edge thereof. Each locking member 819 can be in the form a notch or the like. The filter member 820 can also include a handle 825 that allows a user to pick up and remove (and insert) the filter member 810. Along a top edge, the side wall 822 includes a locating/locking tab 827 that is received within the notch 819 of the filter member 810 that overlies the filter member 820.

The filter member 830 is defined by a side wall 832 and filter media 834 that is attached to and extends transversely across the opening defined between the side wall 832. The side wall 832 is formed of a fluid impervious material (e.g., metal or plastic), while the filter media 834 is defined by a mesh of a certain size. In accordance with the present invention, the filter media 834 is disposed at an angle (other than 90 degrees) relative to the side wall 832. FIG. 6 shows the angled nature of the filter media 834. The filter media 834 is thus formed at a downward slope and as discussed below, this orientation of the filter media 834 permits fluid to flow across the filter media.

The side wall 832 includes an opening 833 formed therein which functions as an outlet to permit fluid within the filter member 830 to selectively flow out of the filter member 830. The filter media 834 is formed in relation to the opening 833 and more particularly, the filter media 834 intersects the side wall 832 at a location immediately below the opening 833.

As best shown in FIG. 6, the angle at which the filter media 834 is purposely selected and the opening 833 is purposely formed at a location along the side wall 832 such that when the filter members 810, 820, 830 are stacked and placed in the hollow interior of the vessel 200, the opening 833 is disposed adjacent the opening 502 of the outlet 590.

The filter member 830 also can include an opening (slot or notch) 831 formed along the bottom edge of the side wall 832 that receives a respective locking tab 455 formed on floor 420. The filter member 830 can also include a handle 825 that allows a user to pick up and remove (and insert) the filter member 830. Along a top edge, the side wall 832 includes a locating/locking tab 827 that is received within the notch 819 of the filter member 820 that overlies the filter member 820.

The planes containing the filter media 814, 824, 834 are at least substantially parallel to one another.

In one exemplary embodiment, the mesh size of the first filter member 810 is about 1000 micron; the second filter member 820 is about 500 micron and the third filter member 830 is about 75 micron.

Any number of exemplary materials can be used to construct the filter members, including metals, etc.

Below the filter media, there is an open space between the side wall of the filter member. As discussed below, during cleaning of the filter media, the respective opening (e.g., notch or slot) 811, 821 of the first and second filter members 810, 820, respectively, provide an opening for injecting cleaning fluid through the inlets 460, 470 at a location below the filter media associated with the filter member in which the opening 811, 821 is formed but above the filter media of the filter member that is located immediately below. This arrangement allows for the cleaning fluid to flow through the opening 811, 821 of one respective filter member 810, 820 and directly across the filter media that is part of the filter member that is immediately below.

The vessel 200 can also include mounting structures 211 that extend outwardly from the side wall 210 and can be constructed to mount the vessel 200 to a support structure, such as a wall.

As will be appreciated by the present discussion, the apparatus 100 can be part of a computer based operating system in which various components (electronic components) are in communication with a master controller that can be part of a computer based system. The computer based system includes a processor(s) (controller), a memory for storing information (such as in a database) and preferably, a display that allows selected information to be displayed. For example, the processor can be configured to monitor the current status of the system and also monitor and project an expected cleaning date (time) (i.e., a countdown till the next cleaning time) and this information can be displayed on the display. Other sensed information, such as flow rates of the fluid injected into the vessel for cleaning thereof can be likewise displayed.

In one embodiment, the filter media is formed at about a 45 degree angle relative to the side wall.

In addition, the main inlet 350 is eccentrically formed and when the cover 300 is attached to the vessel 200, the main inlet 350 is located above the highest portion of the filer media 814 of the first filter member 810.

Cleaning Mode

In accordance with the present embodiment, a cleaning operating mode is provided for selectively cleaning the filter media 814, 824, 834 at a predetermined time, which can be at a set fixed interval or can occur when a prescribed condition or event is observed as described below.

Thus, in one cleaning mode, the cleaning process is initiated at a set interval, such as after a certain number of wafers have been processed, a certain amount of time that the filter has been operated or after a certain quantity (volume) of liquid has passed through the filter apparatus. Any number of different sensors can monitor these types of operating conditions and send a signal to a controller once the threshold has been met. The controller can then be programmed to alert the user that it is time to clean the filter members 810, 820, 830.

In one embodiment, the cleaning process is initiated when a threshold pressure differential is observed within the apparatus 100. In particular, a pressure sensor is disposed at the inlet 350 (or in the inlet 20 at the interface between the inlets 20, 350) to monitor and record the pressure at the inlet side of the apparatus 100. Similarly, another pressure sensor is disposed at the outlet 230 (or in the outlet 40 at the interface between the inlets 40, 230) to monitor and record the pressure at the outlet side of the apparatus 100.

When a pressure differential value is observed (comparison between the observed pressures at the two sensors) that meets a threshold criteria indicative that cleaning is needed, then a signal is sent to the controller indicating that the filter media 814, 824, 834 should be cleaned.

To clean the filter members 810, 820, 830, the vessel 200 is isolated relative to the other equipment in that the valve associated with the inlet 350 and the valve associated with the outlet 230 are closed, thereby preventing liquid from flowing into inlet 350 and likewise preventing liquid from flowing out of outlet 230.

It will be appreciated that the cleaning process is initiated with the vessel 200 being at least substantially full of solution (i.e., a cleaning solution). It will also be appreciated that the cleaning solution mentioned herein can take any number of different forms including but not limited to the filtrate that is collected from the apparatus 100 or a cleaning solution from a separate source. The vessel 200 is thus filled with a solution before the cleaning process is initiated. The valves at the inlet 350 and outlet 230 remain closed.

The cleaning process can be comprised of a number of sequential steps that are undertaken to clean the surfaces of the filter media 814, 824, 834. More specifically and according to one embodiment, the each filter media 814, 824, 834 is cleaned independently and in succession, such as starting from the top of the vessel and progressing to the bottom. For example, the cleaning process can comprise first cleaning the filter media 814, then cleaning the filter media 824 and then finally cleaning the filter media 834.

It will be understood that prior to injecting the cleaning fluid across the selected filter media, the valve members of the inlet and outlets associated with the selected filter media are open. Each filter media 814, 824, 834 is cleaned by injecting a suitable cleaning liquid under pressure through the inlet 450, 460, 470, respectively, causing any debris on the filter media to be dislodged and/or dissolved and due to the angled (pitched) nature of the filter media, the cleaning solution naturally flows down the screen towards and through the open outlet associated with the selected filter member. Thus, in the case of cleaning in succession from the top down, the valve members of the inlet 450 and outlet 570 are open and then the cleaning solution is delivered (injected) under pressure through the inlet 450 which is positioned above the top edge of the first filter member 810 and above the filter media 814, thereby resulting in the cleaning solution bathing and flowing, under force, across the filter media 814. The injected fluid (cleaning solution) in effect forms a fast moving stream of fluid within the overall cleaning solution that is contained within the vessel 200. The pressure differential created by the open outlet 570 defines a location of lower pressure and thus, the injected fluid flows to this location based on natural fluid attraction to a location of lower pressure.

Since the cleaning solution is injected under pressure and preferably at an angle, the cleaning solution is directed across the filter media 814 towards the open outlet 570. This arrangement results in most of the cleaning solution flowing out of the outlet 570. However, if some cleaning solution does flow through the filter media 814, the cleaning solution simply falls by gravity into the underlying filter member 820 (and can simply pass through the media 824 and pass into the bottom filter member 830 and into contact with the media 834).

The cleaning process is preferably part of a programmable software application and therefore is controllable to allow the user to program, depending upon any number of different parameters, the length of each cleaning processing step. Thus, the cleaning solution is injected through inlet 450 for either a predetermined amount of time and/or until a certain quantity of cleaning fluid has flowed into the filter member 810. Once this threshold is met, the injection of the cleaning solution stops and the valve members associated with the inlet 450 and outlet 570 are closed. Next, the process is repeated but this time with respect to the second filter member 820.

To clean the second filter member 820, the valve members associated with the inlet 460 and outlet 580 are opened and the cleaning solution is injected through the inlet and passes through the opening (notch or slot) 811 formed along the bottom edge of the filter member 810. As mentioned above, this opening 811 allows the cleaning solution to pass directly across the filter media 824 of the filter member 820. Under pressure, the cleaning solution cleans the filter media 824 and flows out the outlet 580. Once the cleaning process is complete (i.e., a certain amount of time passes and/or quantity of cleaning solution injected), the valve members associated with the inlet 460 and outlet 580 are closed.

To clean the third filter member 830, the valve members associated with the inlet 470 and outlet 590 are opened and the cleaning solution is injected through the inlet and passes through the opening (notch or slot) 821 formed along the bottom edge of the second member 820. As mentioned above, this opening 821 allows the cleaning solution to pass directly across the filter media 834 of the filter member 830. Under pressure, the cleaning solution cleans the filter media 834 and flows out the outlet 590. Once the cleaning process is complete (i.e., a certain amount of time passes and/or quantity of cleaning solution injected), the valve members associated with the inlet 470 outlet 590 are closed. It will be appreciated from a review of FIG. 6 that the angled nature of the inlets 450, 460, 470 (which function as nozzles/injectors) causes the cleaning solution to flow directly across the top surface of the respective filter media for cleaning thereof.

As with the cleaning of the first filter member 810, the second and third filter members 820, 830 are cleaned with the vessel 200 being full of fluid (cleaning solution).

It has been found beneficial in removing residual dry film strip material from the filter media to also employ a counter flow step. In this mode and preferably after the above cleaning steps have been completed, the screen 814 of the first filter member 810 is cleaned by opening the valves associated with outlet 570 (top outlet) and the inlet 460 (middle inlet). The fluid path requires solvent to pass through filter media 814 flowing opposite to normal strainer operation. In other words, when fluid enters the middle inlet 460, it flows upwards through the filter 814 and exits through the top outlet 570. This is in contrast to the normal downward flow of the cleaning solution. This sequence can then be carried out for the filter media 824. The valves associated with outlet 580 (middle outlet) and inlet 470 (bottom inlet) are opened, setting up reverse flow through media 824 in that flow is defined by fluid entering the bottom inlet 470 and flowing upwardly through the media 824 to the middle outlet 580.

In one embodiment, the cleaning solution is injected through the inlets 450, 460, 470 at pressures between about 10 psi to about 20 psi.

It will also be appreciated that instead of a cleaning process defined by successive cleaning steps in which each filter media is cleaned separately in series, a cleaning process can be employed in which all of the valve members of the inlets 450, 460, 470 and outlets 570, 580, 590 are open and cleaning solution is simultaneously injected through the inlets 450, 460, 470.

It will also be appreciated that any cleaning solution that passes through the filter media 834 and rests on the floor of the vessel 200 will be flushed out of the system when the valve member associated with the outlet 230 is opened. Thus, before the valve member associated with the inlet 350 is opened, the valve member associated with the outlet 230 can be opened to drain any cleaning solution.

Since all of the valve members in the apparatus 100 are in communication with and controlled by the master controller, the cleaning process can be a fully automated process in that when it is the appropriate time to initiate the cleaning operation, the controller instructs and controls all of the components, such as the valve members and cleaning solution injectors, etc., to implement one of the cleaning processes described herein.

It will also be understood that the apparatus 100 is configured to allow a total cleaning operation to be implemented in which filter members 810, 820 are thoroughly cleaned so as to allow the filter members 810, 820, 830 to be removed from the vessel 200 without threat of contact with any harmful chemicals, such as the cleaning solution. More particularly, the cleaning agent is the dry film strip solvent that is typically detrimental to human health, consisting of a chemical that is absorbed quickly into skin and acts as a carrier for a second chemistry that is toxic.

In this operating mode, which can be thought of as being a total shut down or total clean, the above cleaning process is first implemented to clean the filter media 814, 824, 834 with the injected cleaning solution. Then, all of the valve members associated with the inlets 450, 460, 470 and outlets 570, 580, 590 are closed and then the valve members of the inlet 350 and outlet 230 are opened. A gas, such as nitrogen gas, is injected under pressure through the inlet 350 and serves to displace any cleaning solution that remains in the vessel 200. Any cleaning solution is in effect blown out through the outlet 230. Next a volatile liquid, such as isopropyl alcohol (IPA), can be injected through the inlet 350 for rinsing/cleaning the surfaces of the vessel 200 and the filter members 810, 820, 830. Since IPA is highly volatile, it evaporates easily into air and is safe to touch. After performing the preceding steps, the vessel cover 300 can be removed and the filter members (baskets) 810, 820, 830 can be removed for additional cleaning, repair, replacement, etc.

Thus, the task of manually opening the strainer system for maintenance is now far safer with the chemical concerns greatly reduced.

The following features and objectives are realized with the apparatus and cleaning method in accordance with the present invention: (1) an apparatus for reducing the size of the filtration required to re-circulate dry film solvent; (2) an apparatus for reducing the size of the tool required to perform the dry film strip; (3) an apparatus for reducing the cost of the dry film strip process via increased chemical life, reduced down time, decreased footprint of the tool; (4) an apparatus to decrease tool downtime via automatic filter regeneration; (5) an apparatus to increase chemical life through automatic filter regeneration; and (6) an apparatus to clean and decontaminate dry film solvent filters without exposing humans to objectionable chemistry. The preceding list is not meant to be an exhaustive list.

According to one embodiment, the apparatus and method according to the present invention allows for: (1) the incorporation of a single multi-stage strainer system that permits screens of decreasing mesh gauge to filter out solid debris down to a size that is acceptable to downstream plumbing and to cleanliness specifications for the product to be processed; (2) the multi-stage strainer has a series of solvent inlet and drain valves at strategic locations to provide clean solvent for washing the residual dry film material off the screens and down the drains; (3) the valve and drain locations provide downward, upward and cross flow patterns; (4) the multi-stage strainer has a rinsing fluid and nitrogen supply to purge the harmful solvent from the strainer internals in order to make the strainer safer for humans to open the strainer housing when necessary; (5) for routine operation a software based trigger will initiate an automated sequence to flush dry film material from the strainer in a fashion that eliminated the need for the tool to shut down or a person to be involved; and (6) the multi-stage strainer is a fraction of the size of a series of single dimension strainers in series.

What is claimed is:

1. An apparatus for filtering dry film solvent comprising:
   a hollow vessel having a side wall, an open top end and a second end that includes a main outlet that allows fluid to flow out of a hollow interior of the vessel;
   a removable cover that closes off the open top end of the vessel, the cover including a main inlet to allow fluid to flow into the hollow interior of the vessel;
   at least one fluid inlet port formed along the side wall of the vessel and defining an entrance into the hollow interior of the vessel;
   at least one fluid outlet port formed along the side wall of the vessel and defining an exit from the hollow interior of the vessel; and
   a removable filter member that is disposed within the hollow interior, the removable filter member being defined by a frame and filter media that extends across the frame and is disposed transversely across the hollow interior of the vessel such that fluid flowing into the hollow interior through the main inlet must flow through the filter media to reach the main outlet, wherein the filter media is disposed at an angle other than 90 degrees relative to the frame of the filter member, the removable filter member being disposed within the hollow interior such that the at least one fluid inlet port and the fluid outlet port are disposed above a top surface of the filter media and in registration with one or more openings formed in the frame of the filter member, thereby permitting a cleaning solution to flow through the at least one fluid inlet port into the filter member across the filter media before exiting the filter member and flowing through the at least one outlet port.

2. The apparatus of claim 1, wherein each of the fluid inlet port and the fluid outlet port has an associated controllable valve member, each valve member being positioned between an open position in which the cleaning solution can flow therethrough and a closed position in which the cleaning solution is prevented from flowing therethrough.

3. The apparatus of claim 2, wherein each valve member comprises a one-way valve.

4. The apparatus of claim 1, wherein the filter media is disposed at an angle of greater than 45 and less than 90 degrees relative to vertical.

5. The apparatus of claim 1, wherein the filter media comprises a mesh structure.

6. The apparatus of claim 1, wherein the filter media is attached at one side to the frame at a first location that is proximate a top edge of the frame and is attached at an opposite side to the frame at a second location which is proximate a middle of the frame.

7. The apparatus of claim 6, wherein at least one opening formed in the frame comprises an outlet opening formed immediately above the second location at which the filter media attached to the frame.

8. The apparatus of claim 1, wherein there are a plurality of removable filter members that are disposed within the hollow interior in a stacked relationship relative to one another and the vessel includes a plurality of fluid inlet ports and fluid outlet ports, wherein there is one pair of fluid inlet and outlet ports for each removable filter member.

9. The apparatus of claim 1, wherein the at least one fluid inlet port comprises a plurality of fluid inlet ports including housings that are formed at angles other than 90 degrees relative to the side wall of the vessel, wherein central axes that pass through the fluid inlet ports are parallel to one another.

10. The apparatus of claim 1, wherein there are three filter members, namely, a top filter member, a middle filter member and a bottom filter member that are mated to one another to define a stacked construction that is disposed within the hollow interior of the vessel, wherein each filter member includes filter media and a mesh size of the filter media progressively decreases from the top filter member to the bottom filter member, and wherein there are three sets of fluid inlet ports and fluid outlet ports, with each set being associated with a respective one of the filter members.

11. The apparatus of claim 10, wherein the vessel has a cylindrical shape and each of the three filter members has a cylindrical shape, wherein each filter member is sized such that when inserted into the hollow interior, outer surfaces of the three filter members are in sealed contact with an inner surface of the vessel, wherein the top and middle filter members include locking notches formed along bottom edges thereof and the middle and bottom filter members include locking tabs that are received within respective locking notches for coupling the three filter members in the stacked construction.

12. The apparatus of claim 1, wherein the one or more openings formed in the frame comprises: (a) for the top filter member a first opening formed along a bottom edge of the frame and a second opening formed through the frame between a top edge and the bottom edge; (b) for the middle filter member a first opening formed along a bottom edge of the frame and a second opening formed through the frame between a top edge and the bottom edge; and (c) for the bottom filter member a first opening formed through the frame between a top edge and the bottom edge.

13. The apparatus of claim 1, wherein a bottom of at least one fluid inlet port is formed at a top edge of the frame.

14. The apparatus of claim 1, wherein the cover is attached to the vessel, the main inlet is located above a highest section of the filter media to cause the liquid introduced through the main inlet to first contact the highest section.

15. The apparatus of claim 1, wherein each of the main inlet, the main outlet, at least one fluid outlet port, and at least one fluid inlet port has a valve member associated therewith for selectively controlling fluid flow therethrough, the apparatus further controlling a programmable controller that is in communication with each valve member for selectively causing the valve member to move between an open position and a closed position.

16. The apparatus of claim 15, wherein the programmable controller executes software and operates in a cleaning mode in which the valve members of the main inlet and main outlet are closed and the valve members of at least one fluid inlet port and at least one fluid outlet port are opened for receiving the cleaning solution and discharging the cleaning solution after it has passed across the filter media, respectively.

17. The apparatus of claim 16, wherein there are three filter members, namely, a top filter member, a middle filter member and a bottom filter member that are mated to one another to define a stacked construction that is disposed within the hollow interior of the vessel, wherein each filter member includes filter media and a mesh size of the filter media progressively decreases from the top filter member to the bottom filter member, and wherein there are three sets of fluid inlet ports and fluid outlet ports, with each set being associated with a respective one of the filter members, the programmable controller opening in controlled succession valve members associated with each of the three sets of fluid inlet and outlet ports such that a first set of valve members associated with the first filter member are opened first, a second set of valve members associated with the second filter member are opened second after the first set of valve members are closed, and a third set of valve members associated with the third filter member are opened third after the second set of valve members are closed resulting in the first, second and third filter members being cleaned in series.

18. An apparatus for filtering dry film solvent comprising:
a hollow vessel having a side wall, an open top end and a second end that includes a main outlet that allows fluid to flow out of a hollow interior of the vessel;
a removable cover that closes off the open top end of the vessel, the cover including a main inlet to allow fluid to flow into the hollow interior of the vessel;
a plurality of fluid inlet ports formed along the side wall of the vessel and defining independent spaced entrances into the hollow interior of the vessel;
a plurality of fluid outlet ports formed along the side wall of the vessel and defining independent spaced exits from the hollow interior of the vessel; and
a removable filter assembly comprising a plurality of filter members that are disposed within the hollow interior in a stacked configuration, wherein for each filter member there is an associated fluid inlet port and an associated fluid outlet port, each filter member being defined by a frame and filter media that extends across the frame and is disposed transversely across the hollow interior of the vessel such that fluid flowing into the hollow interior through the main inlet must flow through the filter media to reach the main outlet, wherein the filter media is disposed at an angle other than 90 degrees relative to the frame of the filter member, wherein each filter media has a different filter mesh size and the filter mesh sizes of the plurality of filter members decrease in a direction from the top end of the vessel toward the bottom end of the vessel, each removable filter member being disposed within the hollow interior such that the associated fluid inlet port and the associated fluid outlet port are disposed above a top surface of a corresponding filter media and in registration with one or more openings formed in the frame of each filter member, thereby permitting for each filter member, a cleaning solution to flow through the associated fluid inlet port into the filter member and across the corresponding filter media before exiting the filter member through the associated fluid outlet port.

19. A method for removing solids from dry film solvent comprising:

providing a filter apparatus that includes a vessel that has a hollow interior that receives a removable filter assembly comprising a plurality of filter members that are disposed within the hollow interior in a stacked configuration, wherein for each filter member there is an associated fluid inlet port formed in a side wall of the vessel and an associated fluid outlet port formed in the side wall of the vessel, each filter member being defined by a frame and filter media that extends across the frame and is disposed transversely across the hollow interior of the vessel, wherein each filter media has a different filter mesh size and the filter mesh sizes of the plurality of filter members decrease in a direction from a top end of the vessel toward a bottom end of the vessel, each removable filter member being disposed within the hollow interior such that the associated fluid inlet port and the associated fluid outlet port are disposed above a top surface of a corresponding filter media and in registration with one or more openings formed in the frame of each filter member;

introducing the dry film solvent into a main inlet and passing the dry film solvent successively through the filter members in the stacked construction;

discharging the dry film solvent through a main outlet formed in the vessel after the dry film solvent passes through all of the filter members; and introducing into each filter member a cleaning solution to flow through the associated fluid inlet port into the filter member and across the corresponding filter media before exiting the filter member through the associated fluid outlet port.

20. The method of claim 19, further including the step of:

initiating a cleaning process at a predetermine time, the cleaning process comprising the steps of:

closing valve members associated with the main inlet and the main outlet;

opening valve members associated with a first set of first fluid inlet and outlet ports formed in a side wall of the vessel, wherein the first fluid inlet and outlet ports are in selective communication with the hollow interior of the vessel, and wherein the first set of first fluid inlet and outlet ports are positioned immediately above the filter media of a first filter member;

injecting cleaning solution through the first fluid inlet port across the first filter member filter media and out of the first fluid outlet port for cleaning the first filter member filter media;

opening valve members associated with a second set of second fluid inlet and outlet ports formed in a side wall of the vessel, wherein the second fluid inlet and outlet ports are in selective communication with the hollow interior of the vessel, and wherein the second set of first fluid inlet and outlet ports are positioned immediately above a filter media of a second filter member; and injecting cleaning solution through the second fluid inlet port across the second filter member filter media and out of the second fluid outlet port for cleaning the second filter member filter media.

21. The method of claim 20, further including the step of:

preparing the filter apparatus for safe manual intervention by performing the following steps:

supplying nitrogen through the main inlet to force a majority of the solvent to drain through the main outlet formed in the vessel which is in an open position;

introducing a volatile agent through the main inlet to rinse any residual solvent from the vessel and the filter members; and purging the vessel by introducing nitrogen through the main inlet.

* * * * *